July 24, 1951 L. E. TOTUSEK ET AL 2,561,714
AUTOMATIC REEL FOR FISHING LINES
Filed July 5, 1947 2 Sheets—Sheet 2
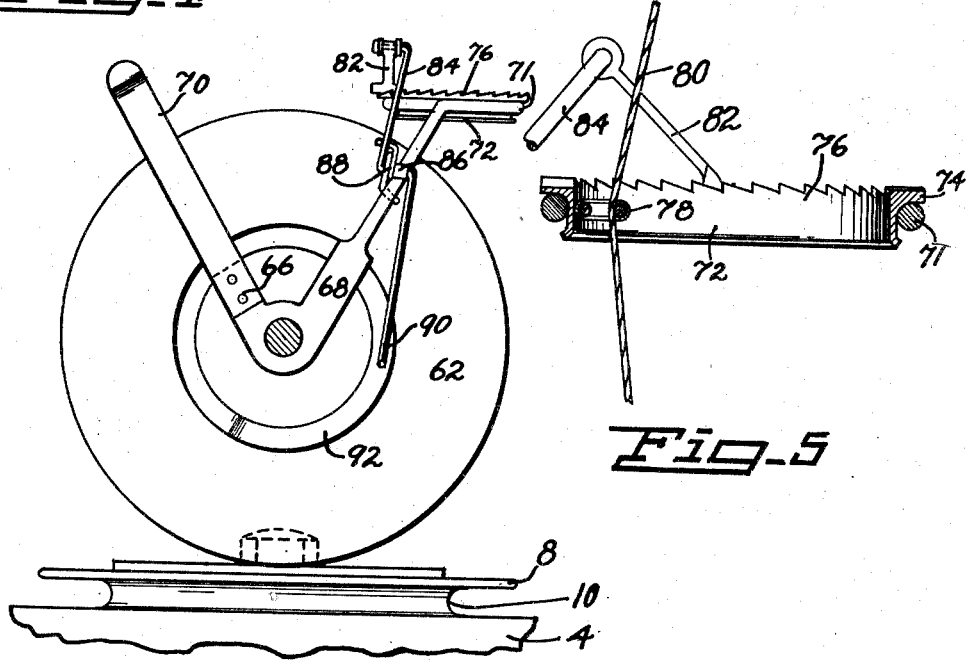
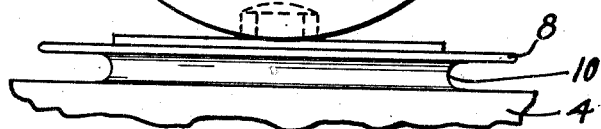
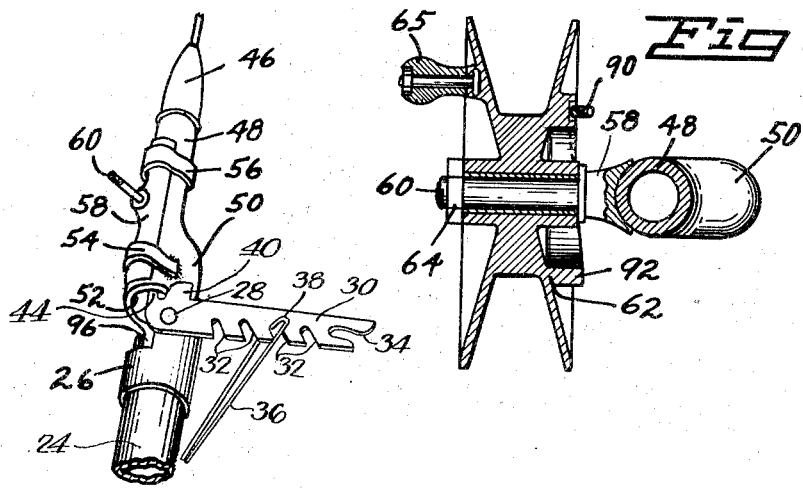
Lidumil E. Totusek
Gladwyn T. Quam
INVENTORS
BY Glenn L. Fish
ATTORNEY Patented July 24, 1951

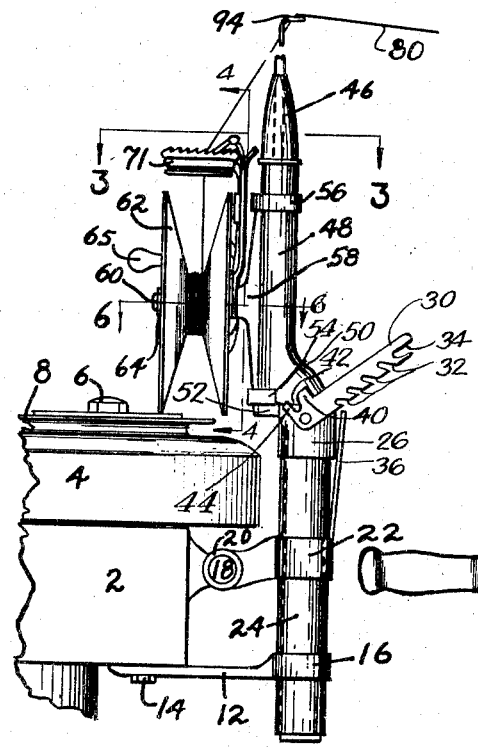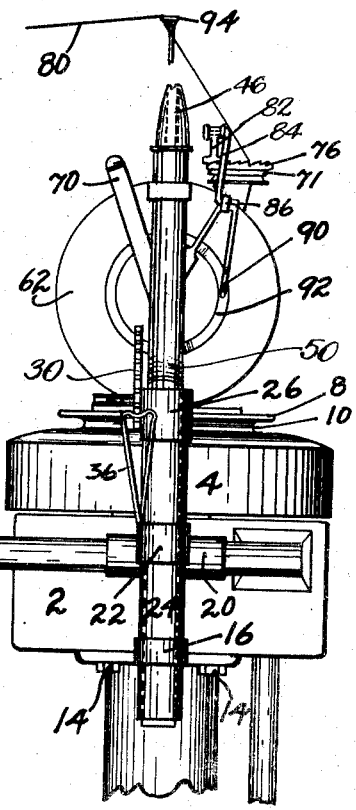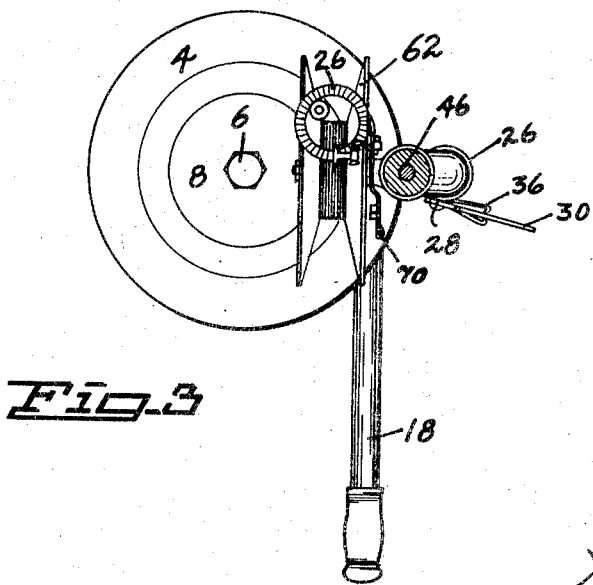

2,561,714

UNITED STATES PATENT OFFICE 2,561,714

AUTOMATIC REEL FOR FISHING LINES

Lidumil E. Totusek and Gladwyn T. Quam, Spokane, Wash.

Application July 5, 1947, Serial No. 759,222

9 Claims. (Cl. 43—15)

Our present invention relates to an improved automatic reel for fishing lines and especially to a device adapted to be mounted on, and used in conjunction with, outboard motors of the conventional type usually mounted on the stern of a small boat and having an upper flywheel rotating in a horizontal plane above the motor.

The device of our invention comprises generally a receiving socket for a fishing rod, and a reel on the rod for the line, so located as to be in frictional contact in a vertical plane with the motor flywheel, together with automatic control mechanism so that as the fish strikes and tensions the line, the reel will revolve winding the line but will permit unwinding of the line if the fish runs thereby continually winding and unwinding until the fish tires and is ready to be netted or gaffed.

In the accompanying drawings we have illustrated one complete example of the physical embodiment of our invention according to the best mode we have thus far devised, but it will be understood that various changes and alterations may be made in the exemplified structure within the scope of the appended claims.

In the drawings:

Fig. 1 is a front elevational view of the device of our invention.

Fig. 2 is a side elevational view.

Fig. 3 is a sectional view at line 3—3 of Fig. 1.

Fig. 4 is an enlarged detail view on line 4—4 of Fig. 1.

Fig. 5 is an enlarged detail sectional view of the line guide.

Fig. 6 is a sectional view taken at line 6—6 of Fig. 1.

Fig. 7 is a perspective view showing the release mechanism and the means for attaching the reel to the rod or pole.

Referring now to the drawings wherein we have illustrated the present preferred embodiment of our invention we employ the outboard motor 2 having a flywheel 4 secured by nut 6 and formed with the flat plate 8 under-cut or grooved at 10 for the usual starting rope. Bracket 12 secured to the motor by bolts 14 has a collar 16 and on the steering handle 18 of the motor we provide a sleeve 20 having a collar 22 aligned with the collar 16 to receive the socket-tube 24 rigidly mounted therein. The upper end of this base, or socket-tube, is enlarged to form a socket-bearing 26 having an exterior pivot pin 28 for a line-control arm 30 that is provided with a series of edge notches 34, and a wire spring brace 36 fastened at its lower end to the collar or band 22, said brace having at its outer end a cross bar 38 for selective engagement with one of the notches to hold the arm in set position. The inner, pivoted end of the control arm is fashioned with an offset cam-head 40 in which a notch 42 forms a retaining lug or latch 44 that coacts with the rod-mount in upholding it free of the friction drive plate 8 of the motor.

The fishing pole or rod 46 is mounted in a tubular holder 48, and the holder has an offset bearing head 50, parallel therewith; and the head is swiveled or pivoted in the bearing socket 26 of the tube 24. At its lower end the holder terminates in an annular edge or sleeve 52 that is adapted for engagement by the notch and lug 44 of the control arm for retaining the rod mount in set position, as in Fig. 7.

A well known type of reel is mounted at one side of the holder, and for this purpose a U-shaped socket band 54 is welded to the holder, and an upwardly spaced slip-ring 56 is fitted on the holder, for frictionally retaining the lower and upper ends respectively of an upright reel-base 58 having a horizontally projecting and integral axle bolt 60. The reel 62 is journaled on the bolt in position for coaction with the drive plate 8, a nut 64 secures the reel against displacement, and the reel may be manually turned for reeling the line by use of hand knob 65.

For use in braking the reel, and also for controlling winding movement of the line 80 as it is being wound upon the reel, a V-shaped frame is perforated and mounted on the axle-bolt between the reel and the base 58, with its bracket arms 66 and 68 diverging as shown in Fig. 4. The bracket arm 66 has attached thereto a resilient pressure blade 70 that extends radially past the periphery of the reel and performs the functions of a friction brake when manually pressed against the side of the reel.

The rigid arm 68 of the bracket frame terminates in an integral horizontally disposed bearing ring 71 in which a collar or rack ring 72 is swiveled, with its flange 74 serrated at 76, and a guide loop or beaded eye 78 is rigidly mounted on the inner face of the collar through which the fishing line 80 is threaded from the reel.

For operating the swiveled rack and its guide, as the line is reeled in, a dog or pawl 82 coacts with the rack ring at 76, and the pawl is pivoted on one end 84 of a two-arm lever, and this rocking lever is pivoted at 86 on the supporting arm 68, a spring 88 being mounted on the supporting arm to press against the lever arm 84 and hold the pawl in engagement with the swivel rack. The other end of the rocking lever, at 90, is pressed against an annular cam surface 92 on the adjoining side of the reel, so that, as the reel revolves the cam rocks the lever for operating the pawl.

From the guide loop or eye 78, the line is passed through the end notch 34 of the control lever 30, and thence through the eye or tip ring 94 of the pole or rod, as indicated in Fig. 1, to the hook-end of the line. When a fish strikes the hook and pulls on the line this action swings the notched control arm 30 upwardly on its pivot 28, thereby releasing the control arm from the retaining spring brace 36 initially engaged in a selected notch of the arm; and it will be noted that the degree of resistance to a pull on the arm may be varied by adjusting the cross bar of the spring brace in a notch nearer to or farther from the pivoted end of the control arm. As the outer end of the control arm swings upwardly, the pivot swings downwardly releasing the lug 44 and notch 42 from the holder, and this swinging movement of the cam head 40 against the holder swings the latter with its bearing head 50 in the socket bearing 26 to swing the reel laterally into position directly over the driving plate of the flywheel. At the end of the axial swinging movement of the holder its bottom sleeve 52 drops into a notch 96 in the upper end of the socket bearing 26, bringing the reel into frictional engagement with the drive plate, and the reel is thereby rotated to wind the line.

Should the fish fight and run, the reel will be rotated in opposition to the drive plate but, when the line is slackened as the fish approaches the boat, the rotating reel takes up the slack, and the constant tension caused by the reel on the line soon tires the fish, which is then quickly reeled in and disposed of in usual manner.

The holder may be removed from the socket tube 24 and the rod and reel employed in usual manner, and with equal facility the holder with the rod and reel may be re-set in the socket tube for use as heretofore described. When properly set the appliance is automatic in its operation as the reeling power is supplied from the rotating flywheel, and the appliance requires no further attention other than re-setting after a catch.

Having thus fully described our invention what we claim as new and desire to secure by Letters Patent is:

1. The combination with a driven flywheel having a plane plate, of a fishing rod, means for supporting said fishing rod proximate the plate, a reel on the rod, said reel having a portion thereof engageable with the plate to rotate the reel, and means under control of the fishing line for maintaining the reel disengaged from the plate until the fishing line is tensioned.

2. The combination with a driven flywheel having a plane plate, of a fishing rod, means for supporting said fishing rod proximate the plate, a reel on the rod, said reel having a rim, the edge thereof positioned so that a rim of the reel is engageable with the plate to rotate the reel, and means under control of the fishing line for maintaining the reel disengaged from the plate until the fishing line is tensioned.

3. The combination with a driven flywheel having a plane plate, of a fishing rod, pivotal means for supporting said fishing rod proximate the plate, a reel on the rod, said reel having a portion thereof engageable with the plate to rotate the reel, and means under control of the fishing line for maintaining the reel disengaged from the plate until the fishing line is tensioned.

4. The combination with a driven flywheel having a plane plate and a base, of a fishing rod, of means including a receiving socket on the flywheel base for supporting said fishing rod proximate the plate, a reel on the rod, said reel having a portion thereof engageable with said plate to rotate the reel, and means under control of the fishing line for maintaining the reel disengaged from the plate until the fishing line is tensioned.

5. The combination with a driven flywheel having a plane plate, of a fishing rod, means for supporting said fishing rod proximate the plate, a reel on the rod, said reel having a portion thereof engageable with the plate to rotate said reel, and a pivotally mounted arm under control of the fishing line for maintaining the reel disengaged from the plate until the fishing line is tensioned.

6. The combination with a driven flywheel having a plane plate, of a fishing rod, means for supporting said fishing rod proximate the plate, a reel on the rod, said reel having a portion thereof engageable with the plate to rotate said reel, and a pivotally mounted arm on the supporting means under the control of the fishing line for maintaining the reel disengaged from the plate until the fishing line is tensioned.

7. The combination with a driven flywheel having a plane plate, of a fishing rod, means for supporting said fishing rod proximate the plate, a reel on the rod, said reel having a portion thereof engageable with the plate to rotate the reel, and a pivotally mounted spring pressed arm under control of the fishing line for maintaining the reel disengaged from the plate until the fishing line is tensioned.

8. In a power operated fishing appliance having a rotary driving member, the combination with a fixed upright socket-support, a tubular rod-holder having an offset pivot-bearing in the socket-support, and a line winding-reel carried by the holder, of a line control-arm pivoted on the socket-support, coacting means on the arm and holder for retaining the latter in elevated position, detachable retaining means for the control arm from which the arm is released by a pull on the line, and means on the arm coacting with the holder when the line is pulled whereby the reel is turned to operative relation with the driving member.

9. In setting and re-setting mechanism for a power operated fishing appliance having a rotary driving member, the combination with a fixed driving member, of a bearing socket, a rod-and-line support having a bearing socket, a rod-and-line holder pivoted in the bearing socket, and a line-winding reel carried by the holder, of a control arm for the line pivoted on the support, coacting means on the arm and holder for retaining the latter in initial elevated position, resilient and detachable means mounted on the support for retaining the arm in set position, and a cam-head on the arm for coaction with the holder, whereby, under a pull on the line the arm is released, and the holder is moved to bring the reel into operative relation to the driving member.

LIDUMIL E. TOTUSEK.
GLADWYN T. QUAM.

REFERENCES CITED

The following references are of record in the file of this patent:

UNITED STATES PATENTS

| Number | Name | Date |
| --- | --- | --- |
| 791,805 | Michaelis | June 6, 1905 |
| 1,206,412 | Cavileer et al. | Nov. 28, 1916 |